United States Patent [19]

Warthan

[11] 4,317,029

[45] Feb. 23, 1982

[54] OPTICS FRAME ASSEMBLY

[75] Inventor: Jerry G. Warthan, Plano, Tex.

[73] Assignee: Recognition Equipment Incorporated, Irving, Tex.

[21] Appl. No.: 166,934

[22] Filed: Jul. 8, 1980

[51] Int. Cl.³ .............................................. G06K 7/14
[52] U.S. Cl. ................................. 235/454; 235/483; 350/47; 350/116
[58] Field of Search ........................ 235/454, 482–486; 350/9, 44, 46, 47, 55, 96.1, 96.18, 110, 114, 116

[56] References Cited

U.S. PATENT DOCUMENTS

| | | | |
|---|---|---|---|
| 3,937,928 | 2/1976 | Sasaki et al. | 235/454 |
| 3,947,817 | 3/1976 | Requa et al. | 235/454 |
| 4,053,765 | 10/1977 | Kuffer | 350/116 |
| 4,215,937 | 8/1980 | Borsuk | 350/90.18 |
| 4,245,151 | 1/1981 | Thomas | 235/454 |

Primary Examiner—Donald J. Yusko
Attorney, Agent, or Firm—John E. Vandigriff

[57] ABSTRACT

An optics frame for use in optical character reading devices has a reflector and lens tube assembly packaged to permit the integration of the optics system and the electronic components so that they become one unit. The reflector and lens tube assembly is mounted on a frame which is in turn secured to a circuit board and connected therewith utilizing a flex circuit.

7 Claims, 9 Drawing Figures

OPTICS FRAME ASSEMBLY

FIELD OF INVENTION

This invention relates to optical systems and more particularly to an integrated optical system for use in optical character reading systems.

PRIOR ART

Some prior optical systes utilize lenses and tubes in the optical system but are not movable in respect of each other to have the ability to adjust the magnification ratio and focus of the optical system. In some instances the optics tube is mounted directly to the frame of the system and does not utilize a separate optics frame to permit focusing and magnification ratio adjustments prior to placing the lens system into the equipment which is used for optical character reading.

BRIEF SUMMARY OF THE INVENTION

The present invention solves the problem of attaching an illumination source and electronics to an optical frame and an electronics scanning array. This system provides fast positive assembly of the electronic components onto a single flex/hard board circuit on which is mounted the illumination source for the reading of a document. A reflector having an LED or incadescent illumination source therein is mounted on an optics frame. The lens is mounted in a lens tube assembly with an electronics scanning array mounted on one end of the lens tube. The lens is adjustable within the lens tube and the lens tube is adjustable within the optics frame in order to have an adjustable focusing and magnification ratio of the system. Once the focusing and magnification ratio is set, the lens tube and lens is secured within frame. These adjustments may be made prior to inserting the scanning system into the over-all optical reading system.

A brief description of the drawings.

Figure 1:
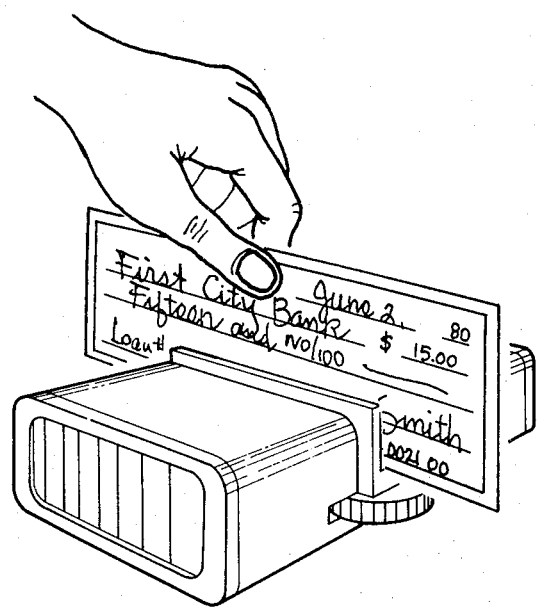
FIG. 1 is a pictorial view of the system of the present invention.

Referring to FIG. 1, there is illustrated a pictorial diagram of a reader of the present system. Illustrated is a document which is being read by the system. Checks and similar documents may have magnetic printing thereon which can be either magnetically or optically read. In such a system, as illustrated, a check may be fed to the system wherein the bank identification code and account number of the person issuing the check may be read. Such a system may be at a teller station, wherein the amount of the check is keyed in by the teller. The keyed information as well as the optically or magnetic read information is fed into a computer recording the transaction of cashing or depositing checks.

Once the information is in the system, thereafter it can be handled by a central computer balancing an active account and issuing statements at the end of the month.

Similarly such a device could be used in a retail environment, wherein a credit card is fed to the system and the account number magnetically read from the card. The cashier can then key in the amount of the sale wherein the customer account and the sale amount is entered into the computer for later billing.

Figure 2:
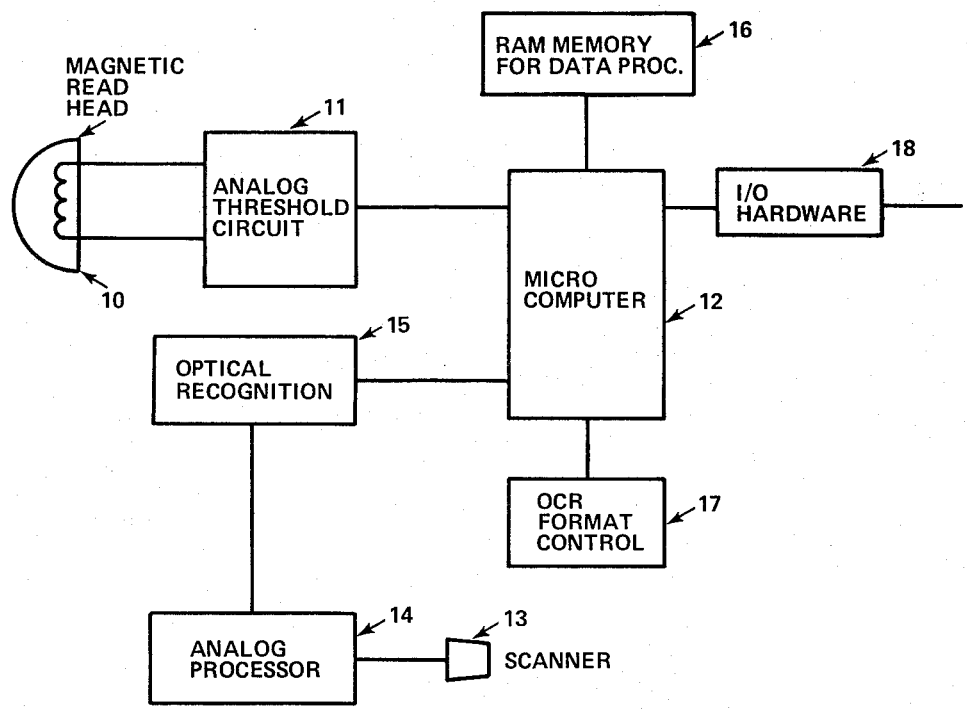
FIG. 2 is functional block diagram of the invention.

In FIG. 2 a magnetic reading head 10 is connected to the system through an analog threshold circuit 11. The analog threshold circuit amplifies the signal generated by the magnetic head and relays it to the computer 12 which is programmed to accept the information and to read the information content thereof.

The optical scanner 13 feeds an analog processor 14 with electrical signals from an electronic array in the scanner 13, and relays them to the optical recognition system 15. Such a system might be similar to that disclosed in U.S. Pat. No. 4,075,605. The optical processed data is transferred to computer 12. Computer 12 has in conjunction therewith a memory 16 circuit. RAM 16 may provide the programming of the system and/or storage when magnetic or optical information is fed into the system. The OCR Format Controlled is used in conjunction with the computer. Since the optical read data has to be in specially readable fonts the OCR Format Control recognizes particular fonts and the format of the data and assists the computer in the analyzing of the optical data. The input output 18 of the computer can be fed to equipment such as a host computer which may store the data for further processing, a CRT for displaying the read data and/or a printer for printing the read data.

Looking in more detail at the structure of the invention, the optical portion of the system consists of an optical frame 31, a reflector 32 and a lens tube assembly 33, packaged in a manner to allow electronic component to become an integral part of the optics assembly.

Figure 3:
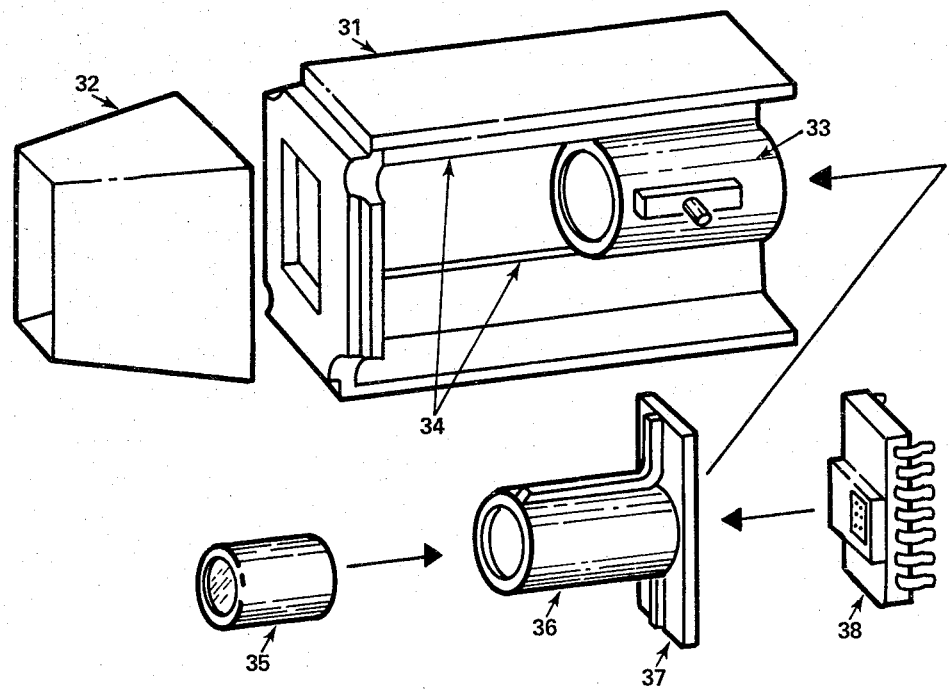
FIG. 3 is an exploded view of a lens assembly used in the present invention.
Figure 4:
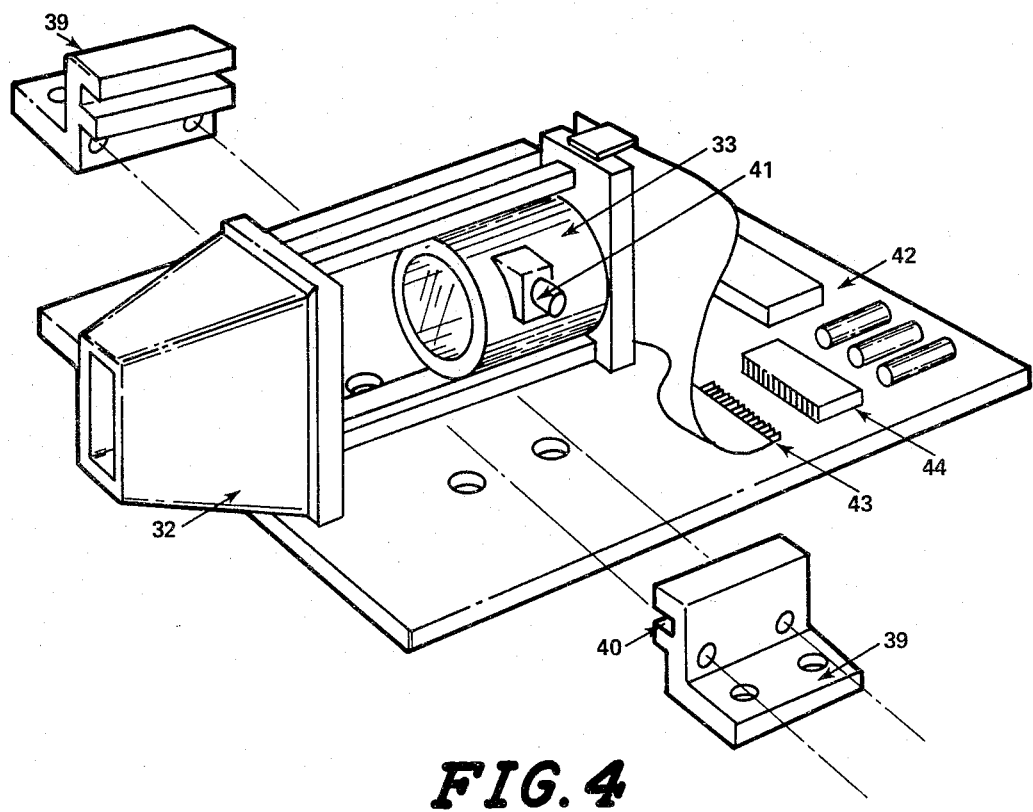
FIG. 4 is a partially assembled view of the lens and scan system of the present invention.

Referring to FIG. 3, the optical frame 31 has a nose reflector 32 mounted to the frame. The reflector is used to direct the image of the document into the system and to keep out extraneous light. The nose reflector also includes the illumination source (not illustrated) which illuminates the document from which the data is to be read. The optics frame forms a back wll of the reflector and also is a lens tube assembly carrier. The frame also provides mounting features to mount a circuit assembly. The entire optics assembly mounts onto the circuit board as illustrated in FIG. 4. The optics frame is designed such that no direct external load is applied to the frame or reflector to cause misalignment and warpage. The optics frame accepts the lens tube assembly and positions all the optical components on a common structure to insure proper alignment.

The lens tube 36 is a plastic part that provides the lens mounting and focusing adjustment and also provides for the mounting of the electronics array 38.

Looking at FIG. 3, the lens 35 is inserted into the lens tube 26. The electronic array 38 is mounted on the flat surface at one end of the lens tube. This assembly is inserted within the tube 33 on the optics frame 31. The tube may be adjusted on the tracks 34 so that the correct magnification is obtained. After the lens assembly is properly positioned, the brackets 39 are positioned at each side of the tube with the pin 41 fitting within the slot 40 of the brackets to secure the lens assembly in place. The electronic array 38 is then interconnected with the circuit board 42 through the flexible circuit 43.

Figure 5:
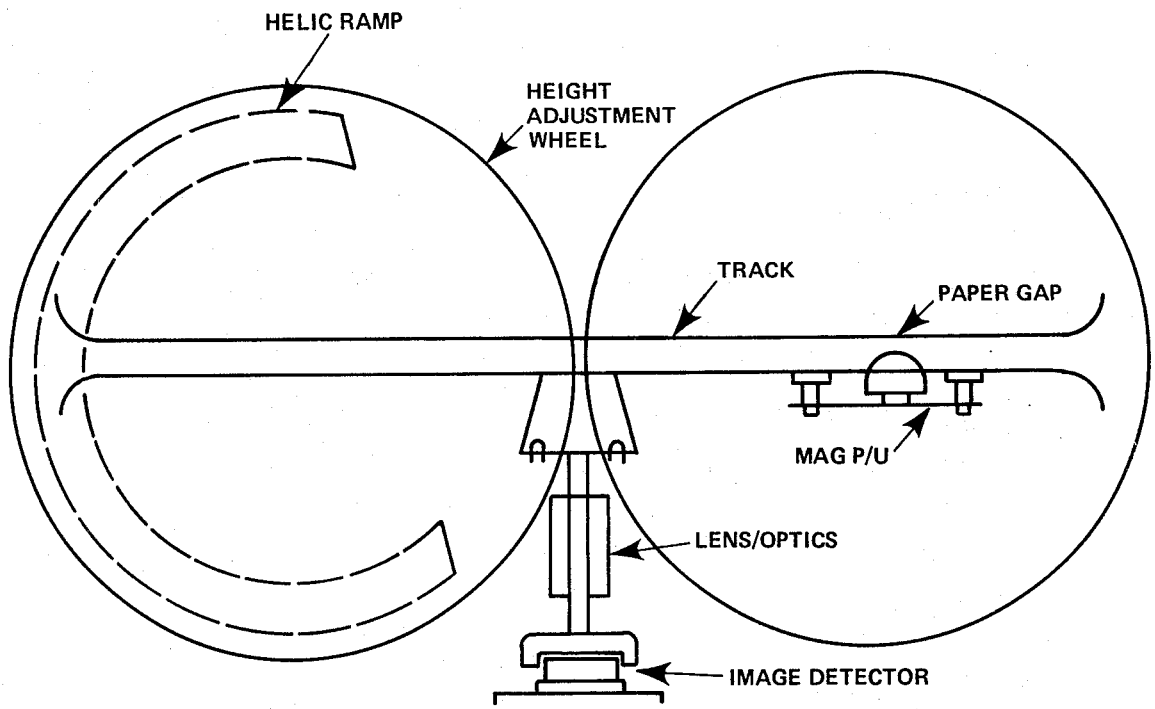
FIG. 5 illustrates the document slot, readers and adjustment mechanism of the system shown in FIG. 1.
Figure 6:
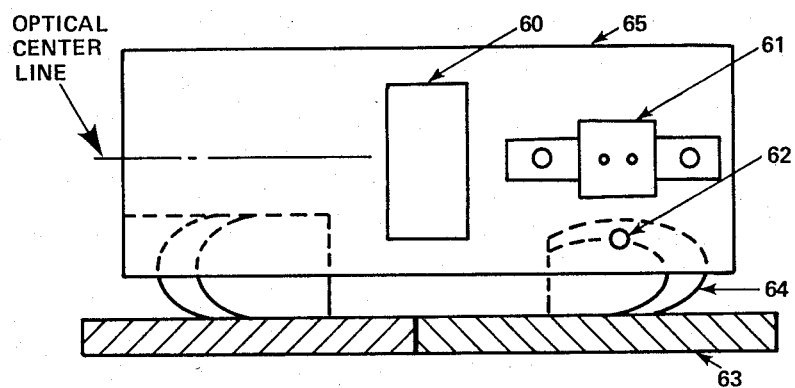
FIG. 6 is a front view of the mechanism in FIG. 5.

FIG. 5 illustrates the relative positions of the magnetic and optical pickups in regard to the document track. The document track 65 has an opening 60 therein (FIG. 6) through which the optical reading is accomplished. The magnetic pick up unit 61 is attached to the track 65 in a fixed position. The entire track can be raised or lowered using the adjustment wheels 63 and the helical ramps 61. The two adjustment wheels engage each other so that the raising and lowering may be accomplished by turning either wheel. As the wheels turn the track rides up and down depending upon the direction the track moves on the ramps. The optical center line is adjusted however, since the magnetic pickup is attached to the track, the relative position to the pickup and the bottom of the track is held constant.

Figure 7:
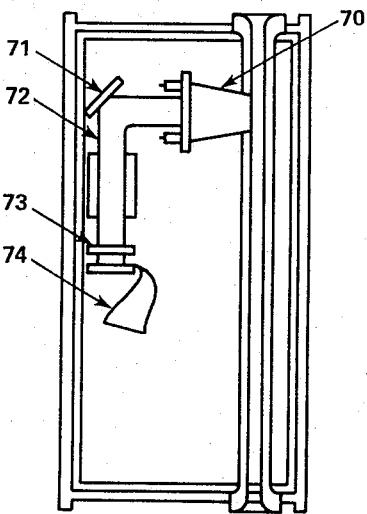
FIG. 7 is a modification of the lens system of FIG. 4. to shorten the system. A corner mirror is placed in the system.

In some instances, where space may be a problem or a smaller unit is desired, the optical path may be deflected as illustrated in FIG. 7. The optical reader will accept the light through the nose section 70, and is deflected through the corner mirror 71 along the tube 72 to the optical array 73. The signals are then transferred to the rest of the circuit through the flex circuit 74.

Figure 8:
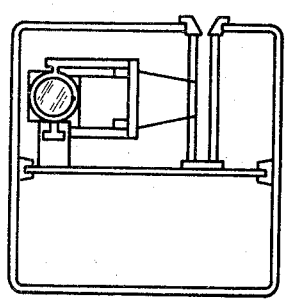
FIG. 8 is a side view of FIG. 7.

FIG. 8 is a side view of the modifications shown in FIG. 7.

Figure 9:
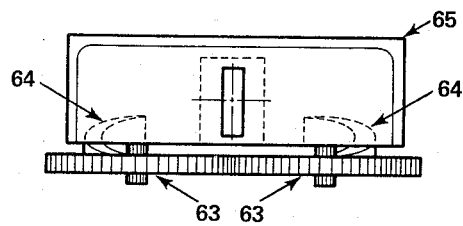
FIG. 9 is an abbreviated illustration of the document track and the adjustment mechanism.

FIG. 9 illustrates the two thumb wheels 63 used to adjust the document track 65 which rides up and down on the helical ramps 64. The turning of one wheel automatically turns the other wheel so that the two ramps move simultaneously to maintain the document track in a horizontal position.

I claim:

1. An optics frame assembly for an electronic scanning device comprising a frame, a lens tube assembly and reflector, said lens tube assembly telescoping into a tubular part of the frame at one end thereof and the reflector mounting on the opposite end of the frame and having apertures thereon through which scanning is accomplished, said lens tube assembly having a flange on one end thereof to which said electronics scanning device may be mounted.

2. The optics frame assembly according to claim 1 wherein said lens tube assembly and tubular postion of the frame are movable with respect to each other to permit adjustment of the focusing and/or magnification ratio of the assembly.

3. The optics frame assembly according to claim 1 wherein said reflector is partially enclosed having a small aperture at one end and a larger aperature at the opposite end, said larger aperture end mounting onto said frame.

4. An optics frame assembly comprising a frame having a tubular portion at one end and flanged mounting surface at the end opposite said one end, an enclosed reflector mounted on said flanged end, a lens and tube assembly with the lens slidably adjustable within said tube, said tube mounted in the tubular portion of said frame.

5. The frame according to claim 4 wherein said reflector has apertures at two ends thereof through which light or optical data impenges upon said lens.

6. The frame assembly according to claim 4 in combination with an electronic array, said array mounted one end of said tube assembly to receive light or optical data transmitted through said lens.

7. The frame assembly according to claim 6, wherein said array interconnects with a circuit board on which the frame assembly is mounted by means of a flex circuit.

* * * * *